F. LAVIOLETTE.
DIRIGIBLE HEADLIGHT.
APPLICATION FILED FEB. 15, 1917.

1,312,914.

Patented Aug. 12, 1919.

FELIX LAVIOLETTE INVENTOR.

BY E. F. Bond

His ATTORNEY.

UNITED STATES PATENT OFFICE.

FELIX LAVIOLETTE, OF GREEN BAY, WISCONSIN, ASSIGNOR OF ONE-HALF TO COUNARD & NEVILLE, OF GREEN BAY, WISCONSIN, A FIRM COMPOSED OF FELIX COUNARD AND JOHN J. NEVILLE.

DIRIGIBLE HEADLIGHT.

1,312,914.     Specification of Letters Patent.     Patented Aug. 12, 1919.

Application filed February 15, 1917. Serial No. 148,831.

*To all whom it may concern:*

Be it known that I, FELIX LAVIOLETTE, a citizen of the United States of America, residing at Green Bay, in the county of Brown and State of Wisconsin, have invented certain new and useful Improvements in Dirigible Headlights, of which the following is a specification, reference being had therein to the accompanying drawing.

The invention relates to dirigible headlights, and particularly to those in use with motor vehicles.

The principal object of the invention consists in the provision of lights which are adjustable in unison with and by the steering apparatus of the motor vehicle.

A further object comprises the adoption of means for eliminating the friction upon turning of the lights.

Another object aims at the provision of means whereby the amplitude of oscillation of the lamps may be varied or easily adjusted, if so desired.

It is also an object of the invention to provide certain novel features of construction, arrangement and combination, which tend to enhance the effectiveness of a device of this particular character, and to increase its general desirability.

With these and other objects in view, the preferred embodiment of the invention is described in the following specification and specifically pointed out in the appended claims.

In the accompanying drawing.

Figure 1:
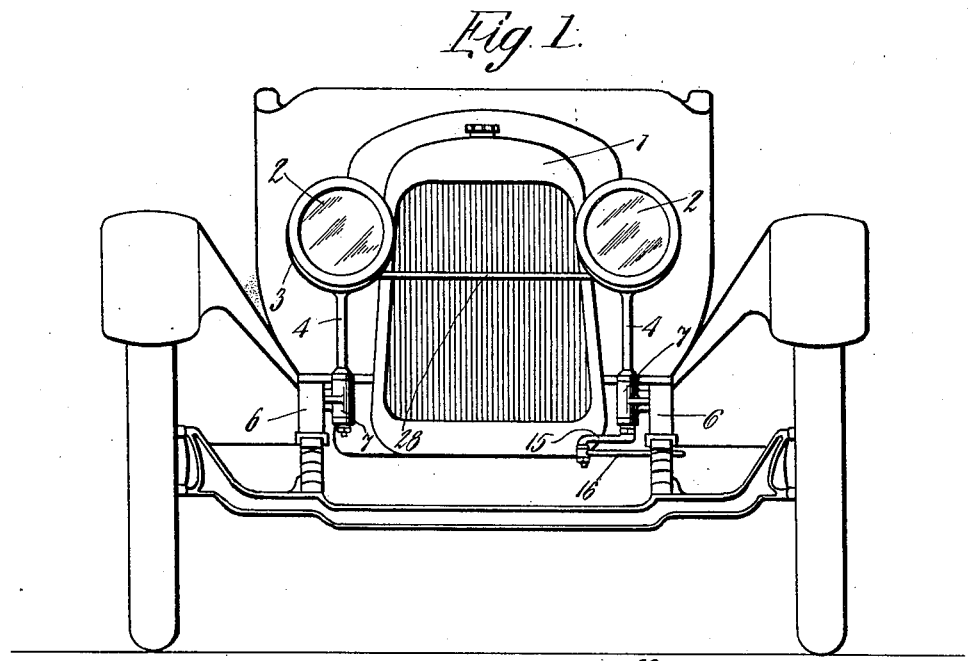
Figure 1 is a front view of a motor vehicle to which the invention has been applied.

Referring to the drawing, 1 designates the front portion of a motor vehicle, and 2 designates the headlights arranged adjacent to said hood portion and supported by the forked part 3 of a bearing rod 4 formed with a tapering lower end 5 for the purpose presently to be described. Secured to the main frame of the vehicle is a bracket 7 formed with a central tapering aperture 8 adapted to receive the lower end 5 of the lamp supporting rod 4, the latter being journaled therein.

Upon the upper and lower face of the bracket 7, collars 9 and 10 are arranged provided with annular raceways 11, to receive a plurality of balls 12, so as to constitute ball bearings insuring thereby the rotation of the supporting rod 4 with negligible friction. Washers 13 are interposed between the balls and the juxtaposed face of the bracket 7, and are also provided with raceways in which the adjacent sides of the balls are received. The upper collar 9 immediately above the tapering portion 5 is shrunk to the rod 4.

Figure 2:
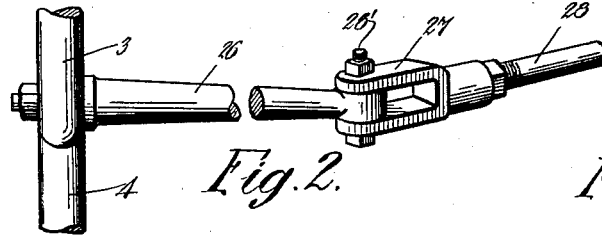
Fig. 2 is a side view of the lamp supporting means, parts thereof being shown in section and other parts being shown in perspective.
Figure 3:
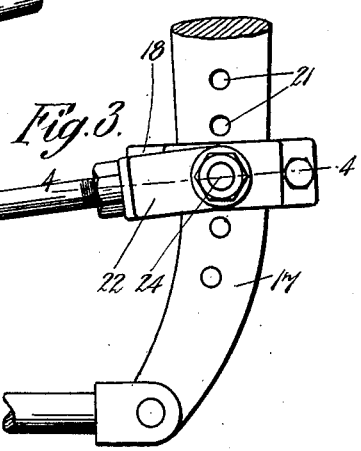
Fig. 3 is a top plan view of a drag link of the steering apparatus to which the means for actuating the headlights is secured.
Figure 4:
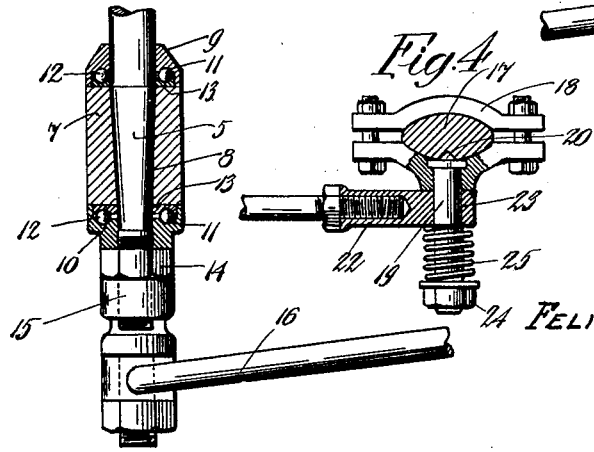
Fig. 4 is a sectional view, the section being taken along line 4—4 of Fig. 3.

As will be seen by reference to Fig. 2, the lower end of the supporting rod 4 is provided with screw-threads so as to adjustably receive the nut 14 which serves to maintain the several parts in proper position. Below the nut 14 a crank arm 15 is secured to the lower end of the rod 4 and attached at its free end to an actuating rod 15 which extends parallel to said crank arm for a portion of its length, and is bent at right angles to be secured to a drag link 17 of the steering apparatus of the vehicle, which drag link interconnects the steering knuckle of the front wheels of the vehicle and by means of which steering of the vehicle is effected.

A clamp 18 comprises two members clamped to the drag link 17, one of said members being provided with a pin 19 which enters with a pointed inner portion 20 one of a series of dents 21 provided at the upper side of said drag link. A socket member 22 is provided with an aperture 23 for the passage of the pin 19, and its socket at the free end thereof is formed with interior screw-threads to adjustably receive the rear end of the actuating rod 16. At the outer end of the pin 19 a nut 24 is provided, and between said socket member 22 and said nut a spring 25 is interposed adapted to maintain the parts in proper position to prevent rattling thereof. The lamp supporting rod 4 extends rearwardly at its upper end to form an arm 26 which is secured to a clevis 27 by means of a bolt 28', or, if preferred, by any other suitable or approved means. The clevis 27 is adjustably secured to a connecting rod 28 which is connected at the opposite end in a similar manner to the clevis of the arm 26 of the other lamp supporting rod. From this it is evident that upon actuation of the drag link, due to the turning to the right or left of the motor vehicle, motion is imparted to the actuating rod 16 which, in turn, effects rotation of the headlights by virtue of the actuating rod 16 being connected to the crank arm of the lamp supporting rod.

Attention is called to the fact that the amplitude of oscillation of the lamps is determined by the position of the clamp 18 on the drag link, and in order to obtain adjustment of the clamping members, the actuating rod 16 and the connecting rod 28 may be adjusted to the proper length by screwing the same in or out of the socket member 22 and the clevis 27, respectively. The provision of a point 20 on the pin 19 prevents the clamp members from traveling on the drag link which in most cases is of tapered construction.

While in the drawing the preferred embodiment of the invention is illustrated, various changes and alterations may be made without departing from the spirit of the invention, and it is therefore my intention not to confine myself to the exact details shown, but to avail myself of such departures which fairly fall within the scope of my invention, as pointed out in the appended claims.

I claim:

1. In combination with a steering link of a motor vehicle, brackets secured to the frame of the vehicle, supporting rods journaled in said brackets, lamps carried by said supporting rods, a crank secured to one of said supporting rods, an actuating rod secured to said crank, a socket member secured to the other end of said actuating rod, a clamp arranged on said steering link, a pin projecting from said clamp, said socket member being mounted on said pin, and means for maintaining the parts in position to prevent rattling thereof and means connecting the lamps for movement in unison.

2. In combination with a steering link of a motor vehicle, brackets secured to the frame of the vehicle, said brackets being equipped with ball bearings, supporting rods journaled in said bearings, lamps carried by said supporting rods, a crank secured to one of said supporting rods, an actuating rod secured to said crank, a clamp arranged on said steering link, means for maintaining said clamp in selected position, a pin projecting from said clamp, a socket member mounted on said pin receiving in its socket the end of said actuating rod, means for yieldably holding the parts against rattling, and means connecting the lamps for movement in unison, substantially as described.

In testimony whereof I hereunto affix my signature.

FELIX LAVIOLETTE.

Copies of this patent may be obtained for five cents each, by addressing the "Commissioner of Patents, Washington, D. C."